United States Patent
Booth et al.

(10) Patent No.: US 7,424,398 B2
(45) Date of Patent: Sep. 9, 2008

(54) BOOT VALIDATION SYSTEM AND METHOD

(75) Inventors: James Ronald Booth, Nicholasville, KY (US); William Pohl Corbett, Jr., Lexington, KY (US); John Francis Gestomski, Lexington, KY (US); Mike Partington, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 45 days.

(21) Appl. No.: 11/425,893

(22) Filed: Jun. 22, 2006

(65) Prior Publication Data

US 2007/0300207 A1    Dec. 27, 2007

(51) Int. Cl.
*G06F 9/445* (2006.01)
(52) U.S. Cl. ...................................... 702/186
(58) Field of Classification Search ................... 702/186
See application file for complete search history.

(56) References Cited

U.S. PATENT DOCUMENTS

| | | | |
|---|---|---|---|
| 5,673,373 A | 9/1997 | Nosaki et al. | |
| 6,362,893 B1 | 3/2002 | Francis et al. | |
| 6,711,675 B1 | 3/2004 | Applewhite et al. | |
| 6,735,696 B1 | 5/2004 | Hannah | |
| 6,775,778 B1 | 8/2004 | Laczko, Sr. et al. | |
| 6,892,305 B1* | 5/2005 | Dayan et al. | 713/192 |
| 2006/0179302 A1* | 8/2006 | Hatakeyama | 713/164 |

OTHER PUBLICATIONS http://mw1.merriam-webster.com/dictionary/algorithm, p. 1.*

* cited by examiner

*Primary Examiner*—Tung S Lau
(74) *Attorney, Agent, or Firm*—Kevin J. Carroll; Steven J. Grossman

(57) ABSTRACT

A boot validation system and method may be used in a computer system to validate boot code before allowing the computer system to execute the boot code. In particular, a secure hash algorithm may be used to compute a hash value of the boot code and the computed hash value may be compared to a preprogrammed hash value stored in a secure non-volatile device. If the hash values match the boot code may be validated and the system may then be allowed to execute the boot code. Once the boot code is validated, the boot code may be executed to validate other code (e.g., firmware) in the computer system. In an exemplary embodiment, the boot validation systems and method may be used in an imaging device, such as a printer.

10 Claims, 5 Drawing Sheets

BOOT VALIDATION SYSTEM AND METHOD

TECHNICAL FIELD

The present invention relates to securely booting computer systems, and more particularly, to a boot validation system and method for use in an image forming device such as, for example, an electrophotographic printer, an inkjet printer, a fax device, a copier, an all-in-one device or a multipurpose device.

BACKGROUND

Imaging device, such as printers, may include various security systems, for example, to protect billing information and/or to protect confidential customer data. In general, mechanisms for achieving printer security may include both hardware and software. In any security system, the weakest link may limit the overall security of the system. In the printer architecture, for example, one of the weakest links may be the vulnerability of the embedded firmware to tampering. Sophisticated hackers may reprogram portions of the firmware that effectively bypasses security measures. One way to protect against these attacks is for a security system to detect that the firmware has been modified and to prevent normal operation of the system. If the firmware itself is used to detect modifications, then the piece of firmware that performs tamper detection should be trustworthy.

SUMMARY

One exemplary embodiment consistent with the present invention relates to a method for boot validation in a computer system. The boot validation method includes: preventing the computer system from executing code upon powering on the computer system; retrieving boot code from a firmware storage device; computing a hash value of the boot code; retrieving a preprogrammed hash value from a secure non-volatile device; comparing the computed hash value with the preprogrammed hash value; and allowing the computer system to execute the boot code if the computed hash value matches the preprogrammed hash value.

Another exemplary embodiment consistent with the present invention relates to a system for boot validation of a computer system. The system for boot validation includes a firmware storage device including firmware, which includes at least boot code, and a secure non-volatile storage device storing a preprogrammed hash value corresponding to the boot code. The system for boot validation also includes logic configured to prevent the computer system from executing code, to retrieve the boot code, the compute a hash value of the boot code, to retrieve the preprogrammed hash value, to compare the computed hash value to the preprogrammed hash value, and to allow the computer system to execute the boot code if the computed hash value matches the preprogrammed hash value.

A further exemplary embodiment consistent with the present invention relates to an imaging device. The imaging device includes a print engine and a controller configured to operate the print engine and to control image forming operations. The controller includes a firmware storage device storing a preprogrammed hash value corresponding to the boot code. The controller also includes logic configured to prevent the computer system from executing code, to retrieve the boot code, to compute a hash value of the boot code, to retrieve the preprogrammed hash value, to compare the computed hash value to the preprogrammed hash value, and to allow the computer system to execute the boot code if the computed hash value matches the preprogrammed hash value.

BRIEF DESCRIPTION OF THE DRAWINGS

The detailed description below may be better understood with reference to the accompanying figures which are provided for illustrative purposes and are not to be considered as limiting any aspect of the invention wherein.

DETAILED DESCRIPTION

A boot validation system and method may be used in a computer system to validate boot code before allowing the computer system to execute the boot code. Once the boot code is validated, the boot code may be executed to validate other executable code (e.g., firmware) in the computer system. In an exemplary embodiment, the boot validation system and method may be used in an imaging device, such as an electrophotographic printer, an inkjet printer, a fax device, a copier, an all-in-one device or a multipurpose device. Those skilled in the art will recognize that the boot validation system and method may be used in other computer systems.

Figure 1:
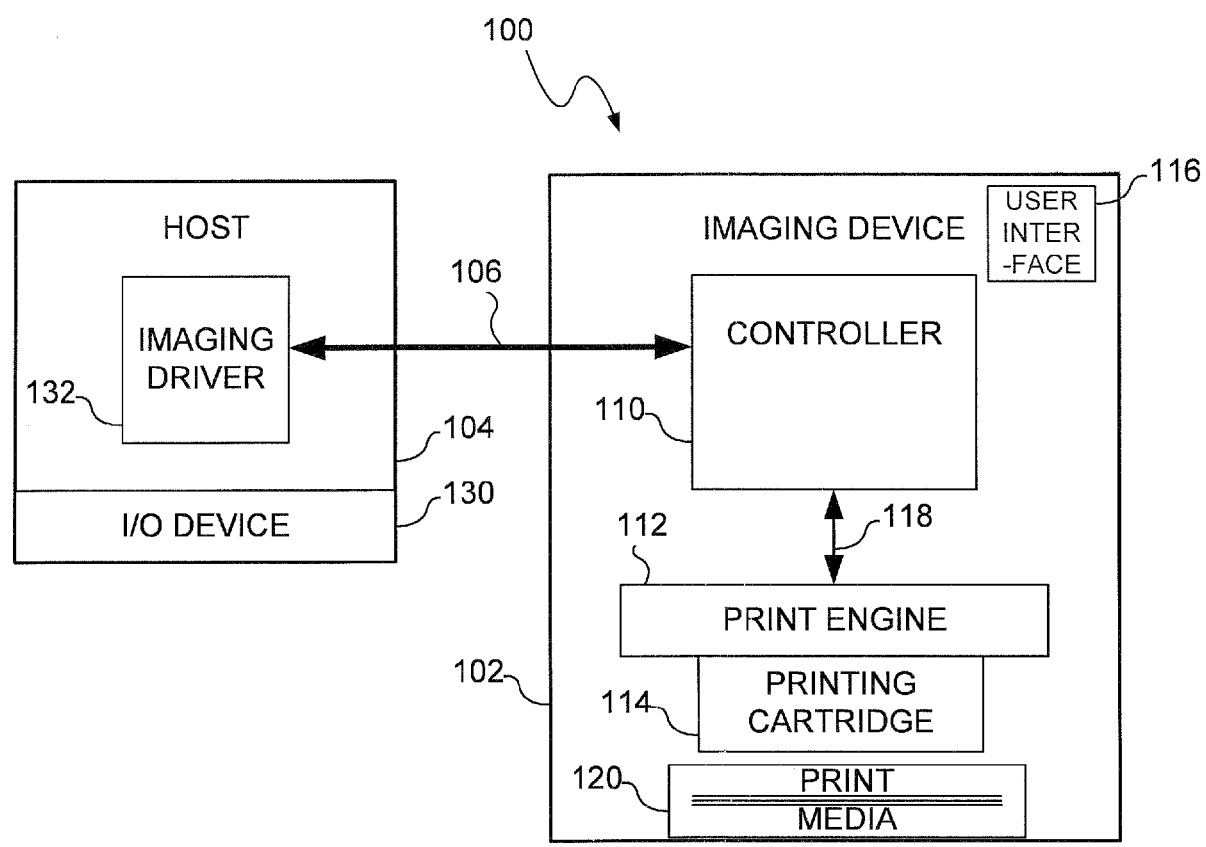
FIG. 1 is a diagrammatic view of an imaging device, consistent with one embodiment of the present invention.

Referring to FIG. 1, a boot validation system and method, consistent with one embodiment, may be used in an imaging system 100. The imaging system 100 may include an imaging apparatus or device 102 and a host 104 that communicates via a communication link 106. The communication link 106 may include any structure that facilitates electronic communication between two components (e.g., a direct cable connection, wireless connection or a network connection) and may be established using wired or wireless technology. Alternatively, the imaging device 102 may be a standalone unit that is not linked to a host. For example, the imaging device 102 may take the form of a multifunction machine that includes standalone copying and facsimile capabilities, in addition to optionally serving as a printer when attached to the host 104.

The imaging device 102 may include a controller 110 and a print engine 112. A printing cartridge 114 may be coupled to the print engine 112 to facilitate printing. The imaging device 102 may also include a user interface 116. The controller 110 may include one or more processor units and memory units (not shown) and may be formed as one or more Application Specific Integrated Circuits (ASICs). The controller 110 may process print data (e.g., received from host 104) and may communicate with the print engine 112 via a communications link 118 to operate the print engine 112 during printing. In the context of the examples of the imaging device 102 given above, the print engine 112 may be, for example, an ink jet print engine, a color electrophotographic print engine or thermal transfer print engine, configured to form an image on a sheet of print media 120, such as a sheet of paper.

The host 104 may be, for example, a personal computer including an input/output (I/O) device 130, such as a keyboard, mouse and/or display monitor. The host 104 may also include a processor, I/O interfaces, memory, such as random access memory (RAM), read only memory (ROM), and/or non-volatile RAM (NVRAM) (not shown). The host 104 may also include one or more I/O ports, such as a universal serial bus (USB) port or other serial or parallel ports (not shown). The host 104 may further include a mass data storage device, such as a hard drive, CD-ROM and/or DVD units (not shown).

During operation involving print data supplied by the host 104, the host 104 may include in its memory a software program including program instructions that function as an imaging driver 132 (e.g., printer driver software) for the imaging device 102. Imaging driver 132 may be in communication with the controller 110 of the imaging device 102 via the communications link 106. The imaging driver 132 facilitates communication between the imaging device 102 and the host 104 and may provide formatted print data to the imaging device 102 to print an image. Alternatively, all or a portion of imaging driver 132 may be located in the controller 110 of the imaging device 102.

Figure 2:
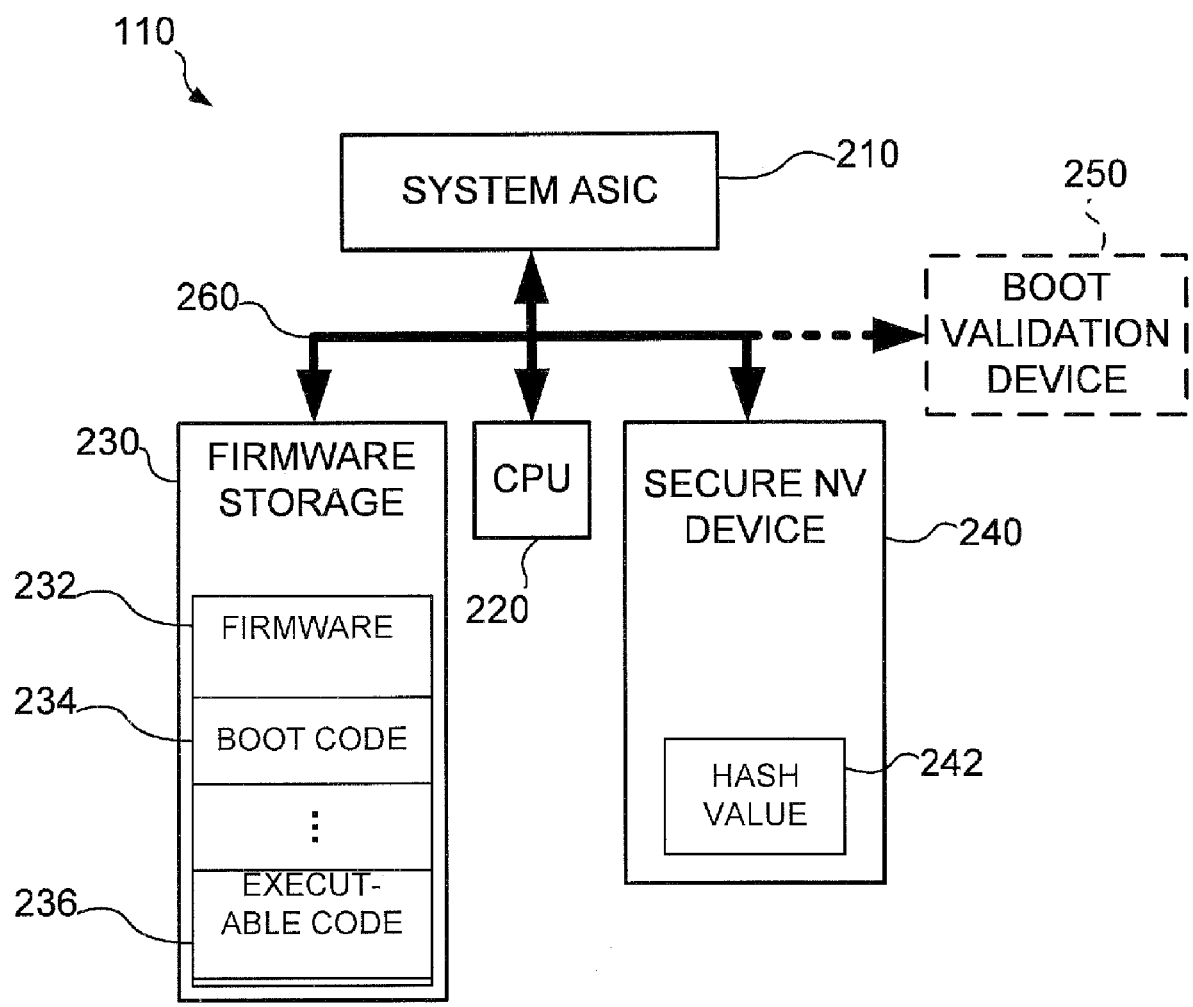
FIG. 2 is a diagrammatic view of an imaging device controller architecture, consistent with one embodiment of the present invention.

FIG. 2 is a diagrammatic illustration of components of the controller architecture that may be used to implement a boot validation system and method, for example, in an imaging device. In one embodiment, the controller 110 may include a system Application Specific Integrate Circuit (ASIC) 210, a central processing unit (CPU) 220, a firmware storage device 230, a secure non-volatile (NV) storage device 240, and an optional boot validation device 250 coupled to each other via system bus 260. Those skilled in the art will recognize that the controller 110 may also include other components and other embodiments of the controller architecture may also be used to perform the boot validation method. Alternatively, one or more of the components 210, 220, 230, 240, 250 may also be located on a printer cartridge 114 (see FIG. 1) or some other removable component in an imaging device.

The system ASIC 210 may include logic responsible for servicing the data needs of the CPU 220 and for communicating with peripheral devices in the system. In one embodiment, the system ASIC 210 may also include logic to perform the boot validation functions, for example, using a secure hash algorithm as described greater detail below. In another embodiment, the separate boot validation device 250 may include logic to perform the boot validation functions. The boot validation device 250 may be a complex programmable logic device (CPLD), a field-programmable gate array (FPGA), another special purpose ASIC, or other type of special purpose chip or hardware.

The firmware storage device 230 may be any type of non-volatile memory such as NAND flash, NOR flash, or an Electrically-Erasable Programmable Read-Only Memory (EEPROM). The firmware storage device 230 may store firmware 232 including boot code 234 in a known location in the firmware storage device 230. As used herein, boot code 234 refers to the code that is executed first after the system is powered on, i.e., when the system is booted. The boot code 234 may be responsible for validating and loading the remainder of the firmware 232. The boot code 234 may also be responsible for initializing and testing the hardware. The firmware 232 may also include other executable code 236 responsible for performing other functions, for example, in the printer or imaging device.

the secure NV device 240 may store secure data used to perform the boot validation, such as a preprogrammed hash value that was programmed when the boot code 234 was programmed and that represents the expected value of the boot code hash as described below. The secure NV device 240 may include any device capable of storing data and protecting that data from attackers (e.g., protecting the data from being changed). One example of a secure NV device 240 is a memory or storage device that is destroyed or rendered unreadable if there is an attempt to modify the data stored therein. Another example of a secure NV device 240 includes a secure EEPROM. the secure NV device 240 may also be a custom chip or a relatively small ROM.

According to one embodiment of the boot validation system and method, the controller 110 may validate the boot code 234 before allowing the CPU 220 to execute the boot code 234. If the boot code 234 can be protected against tampering, then the boot code 234 may be used to validate the remainder of the firmware 232. The boot code 234 may be validated by computing a hash value of the boot code 234 and comparing the computed hash value to the preprogrammed hash value 242 stored in the secure NV device 240. The hash value may be computed using a secure hash algorithm known to those skilled in the art. The secure hash algorithm may therefore make it computationally infeasible to develop boot code that has the same hash value as the original boot code. Examples of secure hash algorithms that may be used include the secure hash algorithm (SHA) family of cryptographic hash functions (e.g., the SHA-1 algorithm) or a keyed-hash message authentication code (HMAC) calculated using a cryptographic hash function (e.g., SHA-1) in combination with a secret key.

If the boot code validation operation succeeds, then the CPU 220 is allowed to operate normally and the boot code 234 may be executed. By executing the validated boot code 234, other firmware code 236 may then be safely validated. If any of the firmware 232 is not validated, the system may be halted and execution of the firmware 232 may be prevented until the firmware can be returned to an authentic state.

Figure 3:
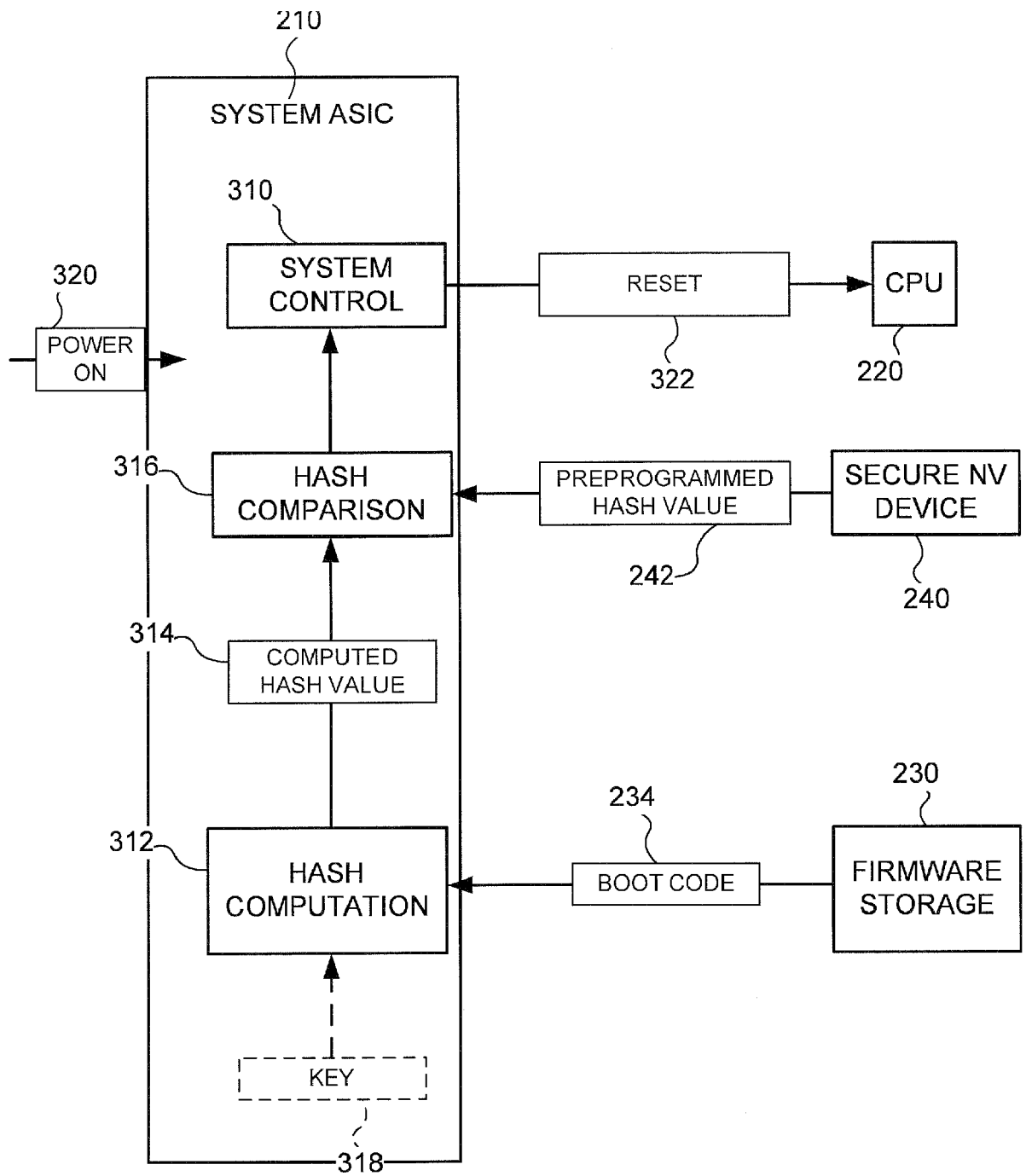
FIG. 3 is a diagrammatic view of another embodiment of a boot validation system using a system Application Specific Integrated Circuit (ASIC)

According to one embodiment of the controller architecture, as shown in FIG. 3, the system ASIC 210 validates the boot code 234 before allowing the CPU 220 to execute the boot code 234. The system ASIC 210 may include system control logic 310 to control the reset signal 322 to the CPU 220 and hold the CPU 220 in reset in response to a "power on" signal 320, thereby preventing the CPU 220 from executing instructions. Alternatively, the system control logic 310 in the system ASIC 210 may prevent the CPU 220 from executing instructions by refusing to fetch instruction for the CPU 220 or by other techniques known to those skilled in the art.

While holding the CPU 220 in reset, the system ASIC 210 may read the boot code 234 from the firmware storage device 230 and the preprogrammed hash value 242 from the secure non-volatile storage device 240. The system ASIC 210 may include hash computation logic 312 to computer a hash value 314 according to the secure hash algorithm. Where a keyed hash algorithm is used, a key 318 is provided to the hash computation logic to seed the hash algorithm. The key 318 may be stored in the system ASIC 210 or in some other location where it is difficult to access and retrieve. The system ASIC 210 may also include hash comparison logic 316 to compare the computed hash value 314 to the preprogrammed hash value 242.

The system control logic 310 in the system ASIC 210 may continue to hold the CPU 220 in reset if the computed hash value 314 does not match the preprogrammed hash value 242. If the computed hash value 314 matches the preprogrammed hash value 242, the system control logic 310 in the system ASIC 210 may release the reset signal 322 to the CPU 220 allowing the CPU 220 to execute instructions.

Figure 4:
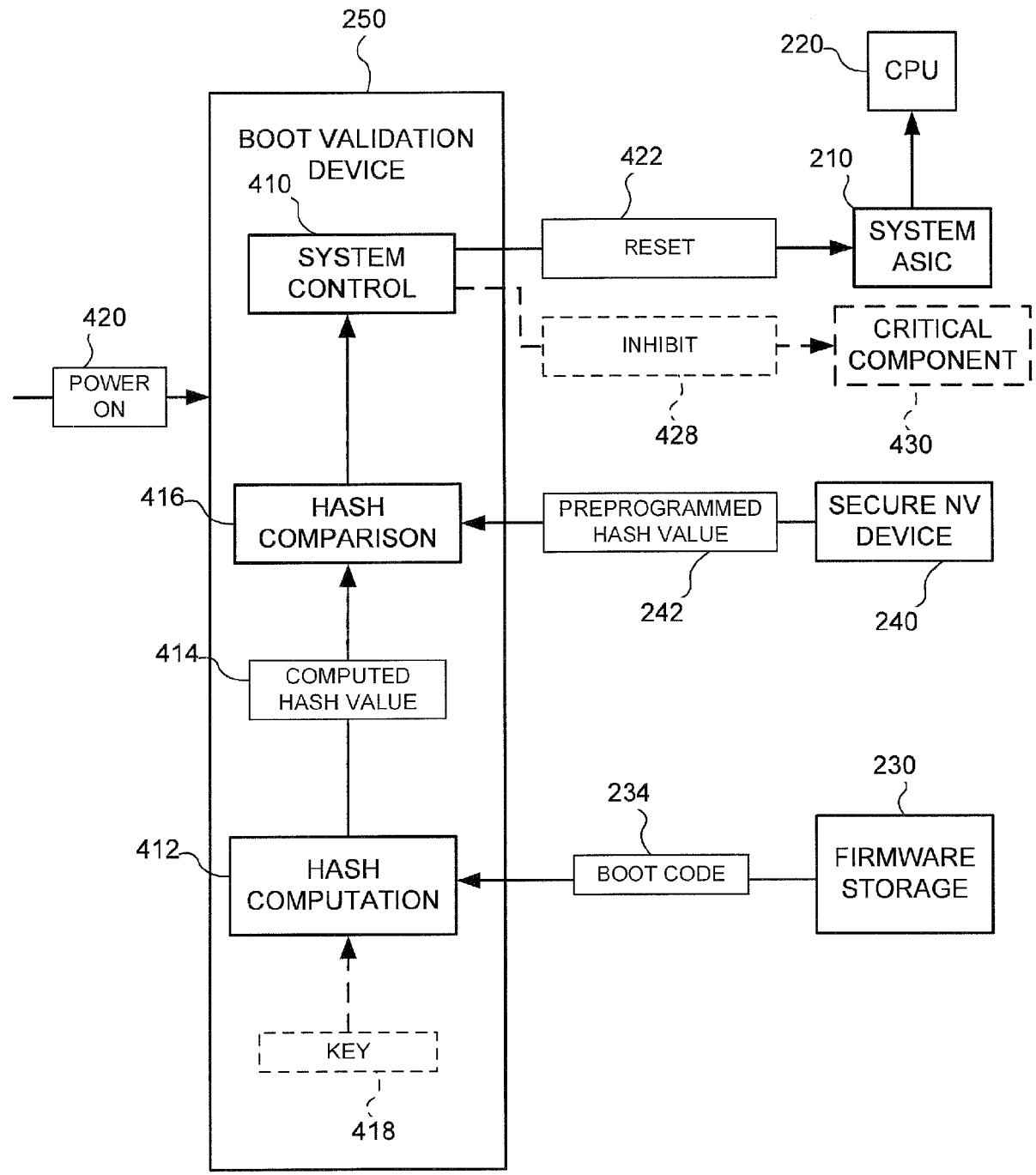
FIG. 4 is a diagrammatic view of another embodiment of a boot validation system using a separate boot validation device.

According to another embodiment of the controller architecture, as shown in FIG. 4, the boot validation device 250 validates the boot code 234 before allowing the CPU 220 to execute the boot code 234. The boot validation device 250 may include system control logic 410 to control the reset signal 422 to the system ASIC 210 and hold the system ASIC 210 in a reset condition in response to a "power on" signal 420, thereby preventing the system ASIC 210 and the CPU 220 from operating. Alternatively, the system control logic 410 in the boot validation device 250 may directly hold the CPU 220 in a reset condition. The system control logic 410 may also inhibit operation of other critical portion(s) or component(s) 430, for example, by controlling a signal 428 to the component 430 to hold the component in a reset condition or to otherwise inhibit operation of that component. In an imaging device, for example, the critical portion(s) or component(s) 430 may be motors, voltage regulators, communications chips, or other critical portion of the controller logic.

In this embodiment, the boot validation device 250 may read the boot code 234 from the firmware storage device 230 and the preprogrammed hash value 242 from the secure NV device 240. The boot validation device 250 may include hash computation logic 412 to compute the hash value 414 according to the secure hash algorithm. Where a keyed hash algorithm is used, a key 418 is provided to the hash computation logic to seed the hash algorithm. The key 418 may be stored in the boot validation device 250 or in some other location where it is relatively difficult to access and retrieve. The boot validation device 250 may also include hash comparison logic 416 to compare the computed hash value 414 to the preprogrammed hash value 242.

The system control logic 410 in the boot validation device 250 may continue to hold the system ASIC 210 (and/or the CPU 220) in a reset condition if the computed hash value 414 does not match the preprogrammed hash value 242. If the computed hash value 414 matches the preprogrammed hash value 242, the control logic 410 may release the reset signal 422 to the system ASIC 210 (or the CPU 220) allowing the CPU 220 to execute instructions.

Figure 5:
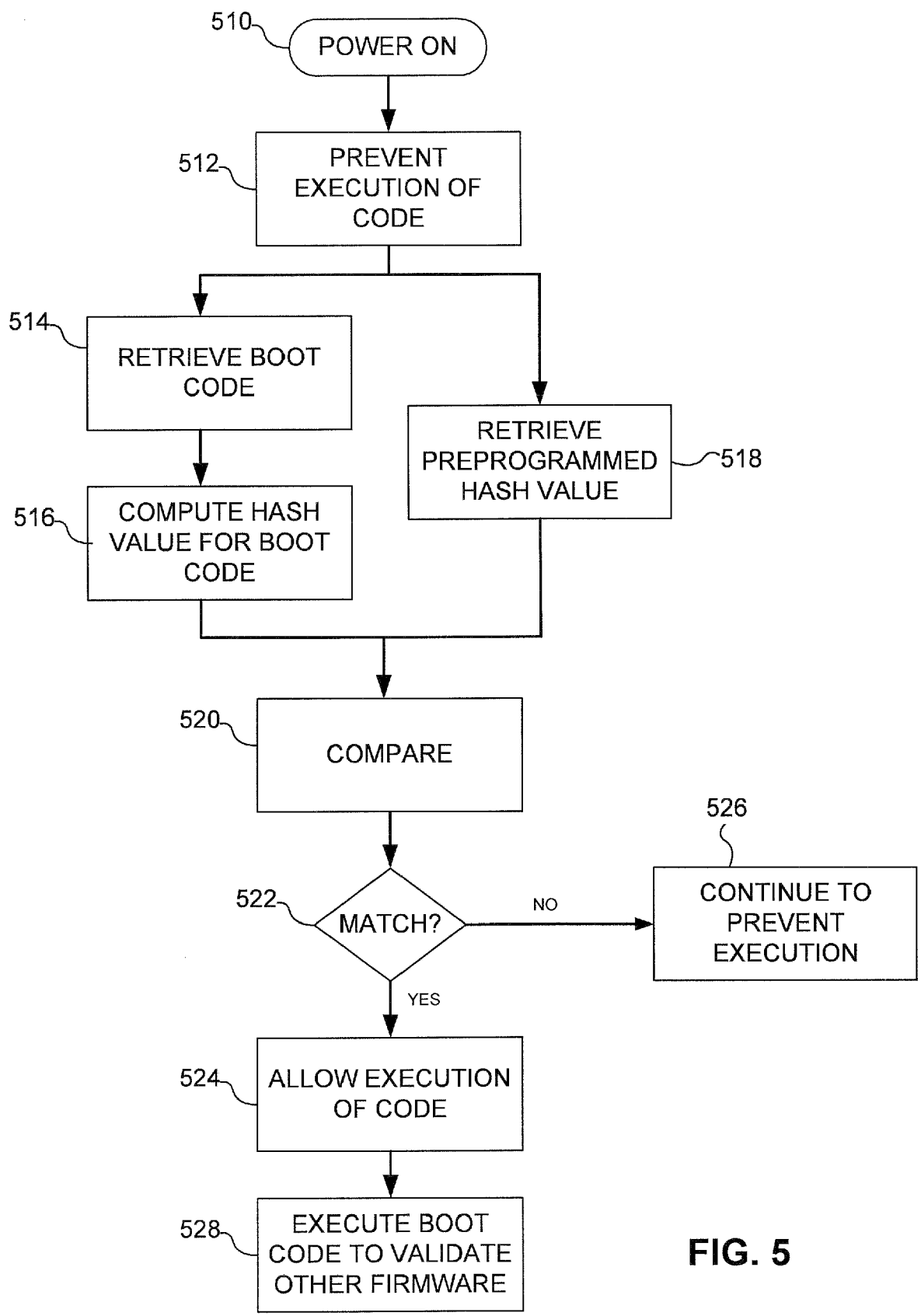
FIG. 5 is a flow chart illustrating a boot validation method, consistent with one embodiment of the present invention.

FIG. 5 illustrates a method for boot validation in a computer system. In an imaging device, for example, the boot validation method may be performed by the controller 110 (e.g., using the system ASIC 210 or the boot validation device 250 described above) or by a removable component such as the printing cartridge 114 (see FIG. 1). When the computer system is powered on 510, the system is initially prevented 512 from executing code, particularly the boot code. As described in the embodiments above, the system ASIC 210 or the boot validation device 220 may prevent the system for executing code, for example, by holding the CPU 220 and/or the system ASIC 210 in reset, thereby preventing the CPU 220 from executing instructions. Alternatively, the system may inhibit operation of some other portion or component in the system, such as motors, voltage regulators, and/or communication chips.

After the system is powered on and execution is initially prevented, the boot code may be retrieved 514 and a boot code hash value may be computed 516 using the secure hash algorithm. The computed hash value may be compared 520 to the preprogrammed hash value, which has been retrieved 518 from a secure NV device. The preprogrammed hash value represents the expected value of the boot code hash. Thus, if the boot code remains unchanged after the initial programming, the computed hash value should be the same as the preprogrammed hash value. If the boot code has been tampered with and changed after the boot code has been programmed, the hash computation should produce a computed hash value that is different from the preprogrammed hash value.

If the computed hash value and the preprogrammed hash value do not match 522 (e.g., indicating tampering with the boot code), the boot code is not validated and the controller may continue to prevent execution 526. In the embodiments described above, for example, the system ASIC 210 and/or the boot validation device 250 may continue to prevent the CPU 220 from executing instructions. The system (e.g., the system ASIC 210 and/or the boot validation device 250) may also prevent operation by "defunctioning" the system or inhibiting operation of some other critical component of the system. The system may also provide an error message indicating that the boot code is invalid. Operation may be prevented until the boot code is returned to an authentic state.

If the computed hash value and the preprogrammed hash value match 522, the controller may allow 524 the CPU to execute code. When operation is allowed 524 after the boot code has been validated, the boot code may be executed by the CPU to perform various boot code functions including validation of other firmware 528. The boot code may validate the remainder of the firmware, for example, using signature verification mechanisms or other standard validation algorithms known to those skilled in the art. One example of such a signature verification mechanism may use the RSA algorithm for public-key encryption. If the other firmware is not validated, the system may provide an appropriate error message or error code and may be "defunctioned" or prevented from operating until the firmware is returned to an authentic state. If the boot code has been validated and is executed, the "defunctioning" may be enforced by the boot code. In a printer, for example, the boot code may cause the system ASIC or CPU to disable the printing function by disabling a component such as a laser driver, fuser or motor driver. Operation may be prevented until the invalid code is returned to an authentic state.

Although the exemplary embodiments illustrate the validation of the boot code before the system is allowed to execute code, other code may also be validated with the boot code before the system is allowed to execute code. If the boot code and/or any other code that is validated using the secure hash algorithm is changed after the initial programming, the preprogrammed hash value will also need to be updated accordingly.

Accordingly, the boot validation system and method may prevent execution of any boot code that may have modified (i.e., tampered with) after the printer or other computer system has been manufactured. Thus, the boot code may be stored with the other firmware (e.g., in the flash) instead of storing the boot code in a separate ROM (Read-Only Memory) to prevent modification.

The foregoing description is provided to illustrate and explain the present invention. However, the description hereinabove should no be considered to limit the scope of the invention set forth in the claims appended here to.

What is claimed is:

1. A method for boot validation in an image forming device including at least one central processing unit (CPU), comprising:

holding at least said CPU in reset in response to a power on signal to prevent said CPU from executing at least boot code upon powering on said image forming device;

retrieving said boot code from a firmware storage device, said firmware storage device storing said boot code together with other executable code including firmware other than boot code;

computing a hash value of said boot code;

retrieving a preprogrammed hash value from a secure non-volatile device;

comparing said computed hash value with said preprogrammed hash value; and allowing said image forming device to execute said boot code if said computed hash value matches said preprogrammed hash value.

2. The method of claim 1 wherein said boot code includes tamper detection code to validate other firmware.

3. The method of claim 1 wherein said hash value is computed using a secure hash algorithm.

4. The method of claim 1 further comprising executing said boot code to validate other firmware.

5. The method of claim 1 further comprising inhibiting operation of at least one component of said image forming device if said computed hash value does not match said preprogrammed hash value.

6. The method of claim 1 further comprising holding a system Application Specific Integrated Circuit (ASIC) in reset.

7. The method of claim 1 wherein said method for boot validation is performed by a cartridge configured for use in the image forming device.

8. The method of claim 1 wherein holding at least said CPU in reset, retrieving said boot code, computing said hash value, retrieving said preprogrammed hash value, and comparing said computed hash value with said preprogrammed hash value are performed by an Application Specific Integrated Circuit (ASIC).

9. The method of claim 1 wherein holding at least said CPU in reset, retrieving said boot code, computing said hash value, retrieving said preprogrammed hash value, and comparing said computed hash value with said preprogrammed hash value are performed by a boot validation device.

10. The method of claim 1 wherein said firmware storage device includes programmable non-volatile memory.

* * * * *